Figure 7:
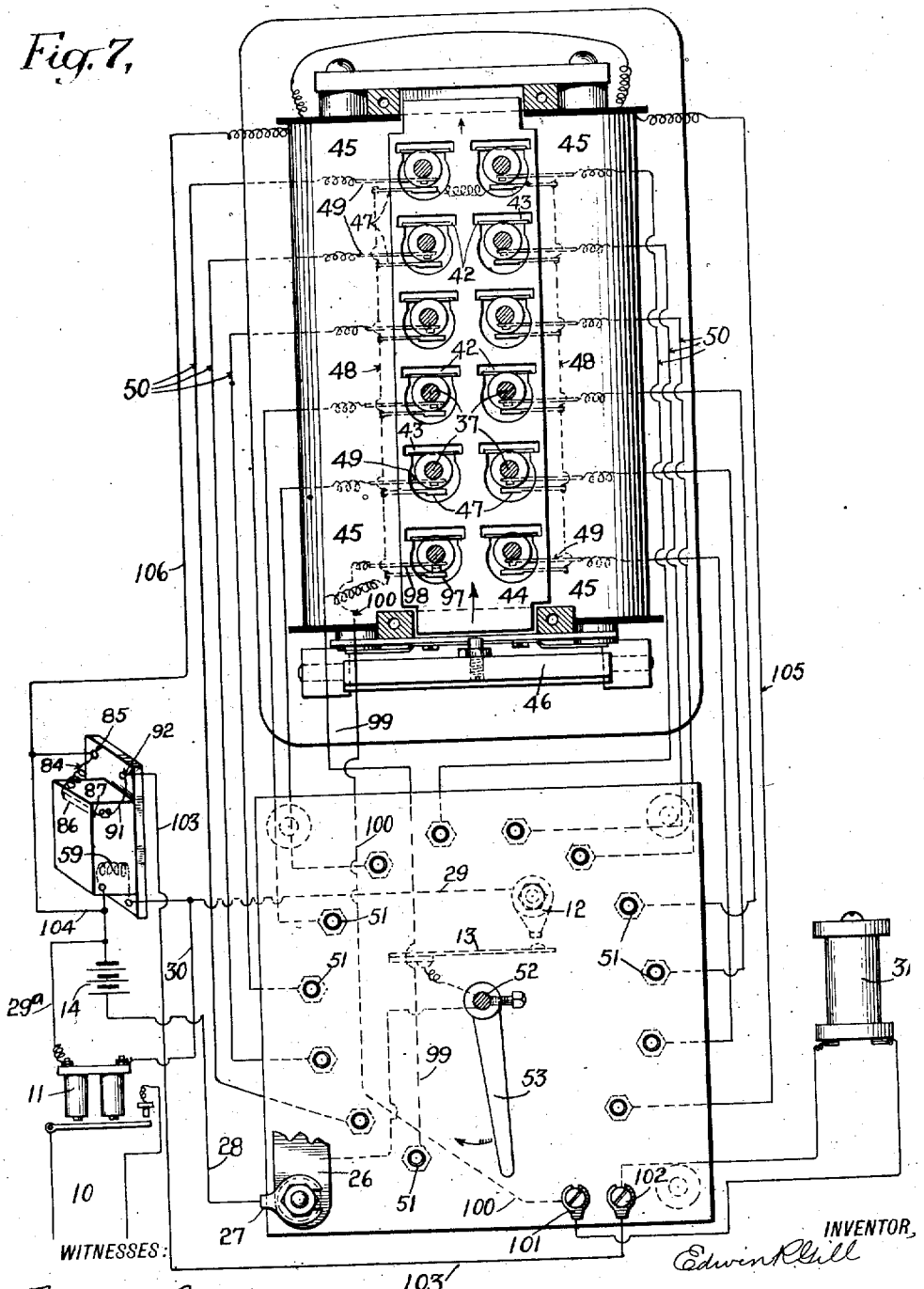

E. R. GILL.
AUTOMATIC SIGNAL OPERATOR.
APPLICATION FILED JULY 22, 1913.
Reissued Sept. 15, 1914.
13,800
6 SHEETS—SHEET 1.
Fig. 1,
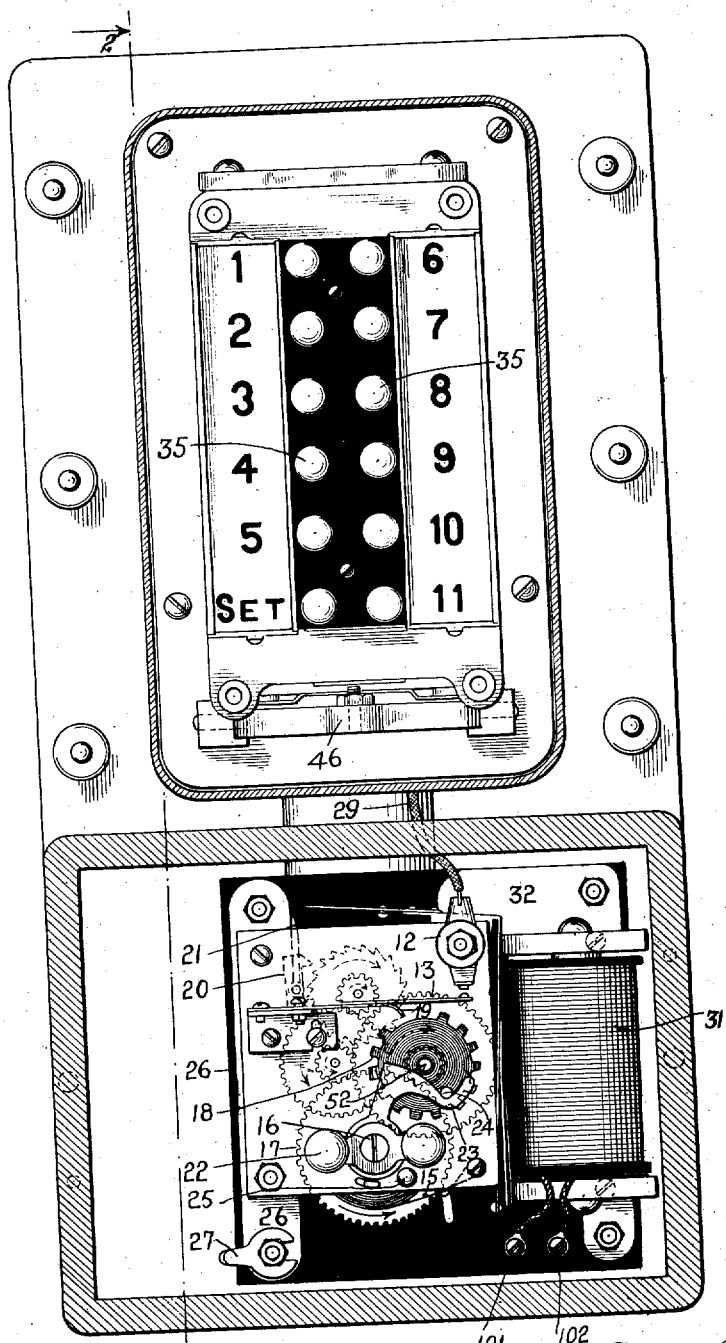
WITNESSES:
Newton A. Burgess
John O. Gempler
INVENTOR,
Edwin R. Gill,
BY
Kenyon & Kenyon
his ATTORNEYS.

E. R. GILL.
AUTOMATIC SIGNAL OPERATOR.
APPLICATION FILED JULY 22, 1913.
Reissued Sept. 15, 1914.
13,800.
6 SHEETS—SHEET 2.
Fig. 2,
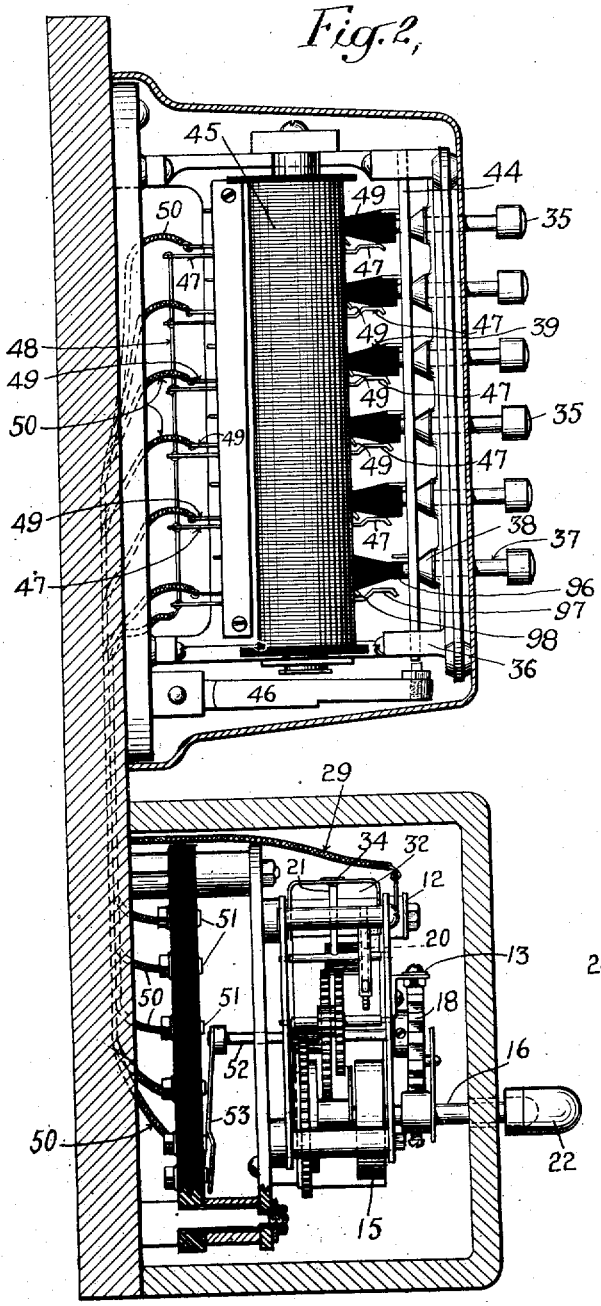
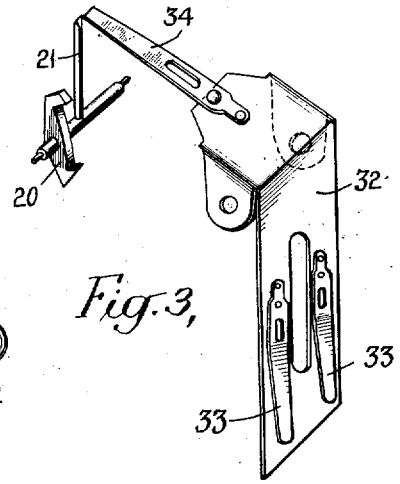
Fig. 3,
WITNESSES:
Milton A. Bergers
John O. Gempler
INVENTOR,
Edwin R. Gill,
BY
Kenyon & Kenyon,
his ATTORNEYS.

E. R. GILL.
AUTOMATIC SIGNAL OPERATOR.
APPLICATION FILED JULY 22, 1913.
Reissued Sept. 15, 1914.
13,800.
6 SHEETS—SHEET 3.
Fig. 4,
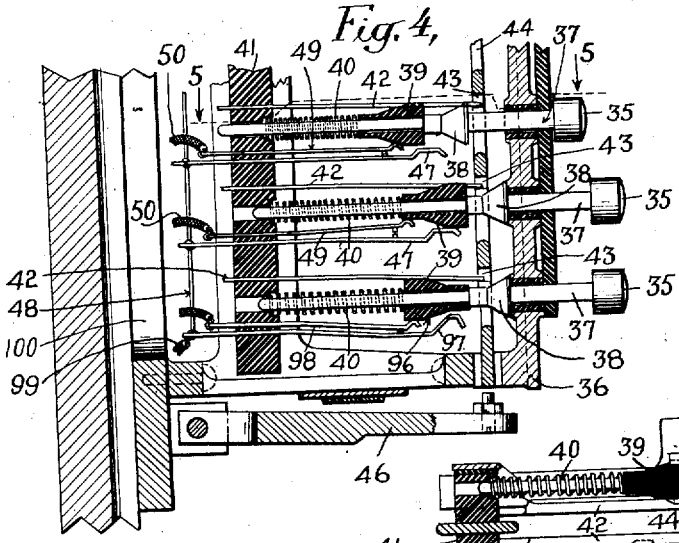
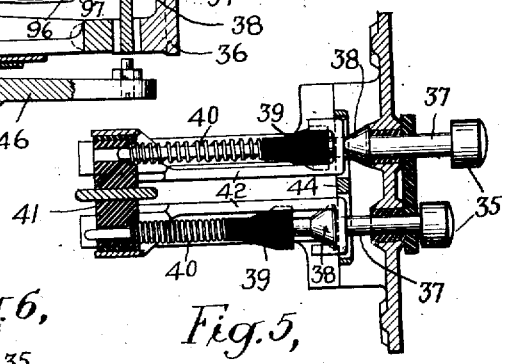
Fig. 5,
Fig. 6,
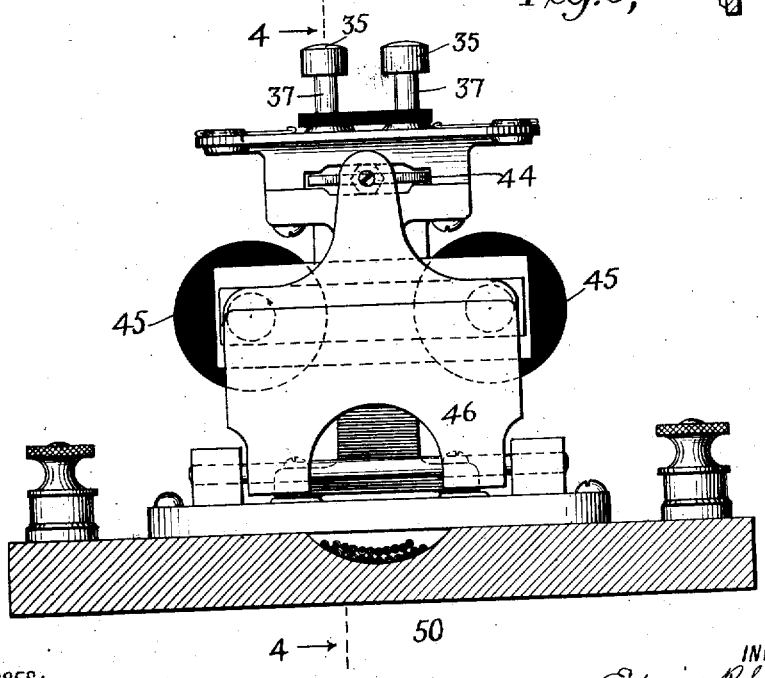
WITNESSES:
Newton A. Burgess
John O. Temple
INVENTOR,
Edwin R. Gill
BY
Kenyon & Kenyon
Their ATTORNEYS

E. R. GILL.

AUTOMATIC SIGNAL OPERATOR.

APPLICATION FILED JULY 22, 1913.

Reissued Sept. 15, 1914.

13,800.

6 SHEETS—SHEET 4.

E. R. GILL.
AUTOMATIC SIGNAL OPERATOR.
APPLICATION FILED JULY 22, 1913.
Reissued Sept. 15, 1914.
13,800.
6 SHEETS—SHEET 5.
Fig. 8,
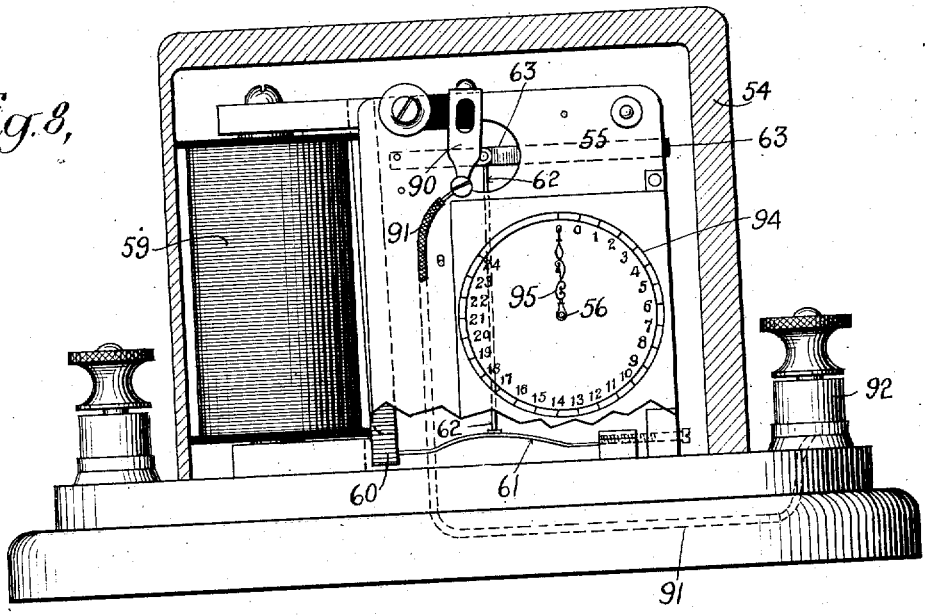
Fig. 9,
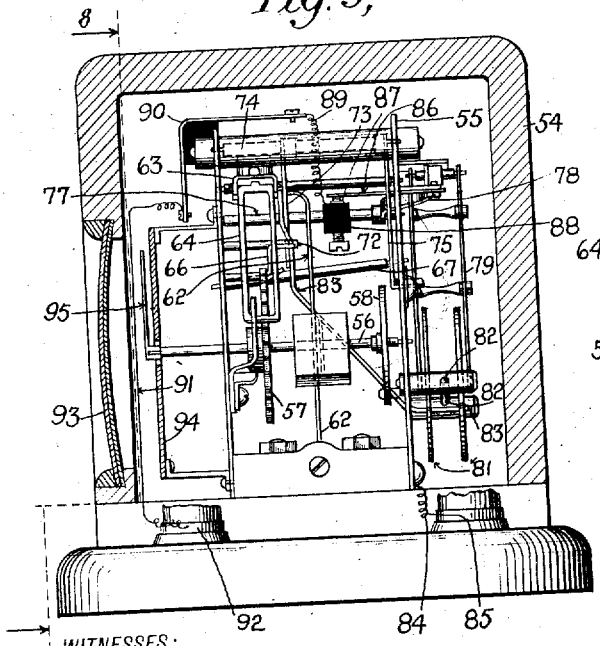
Fig. 10,
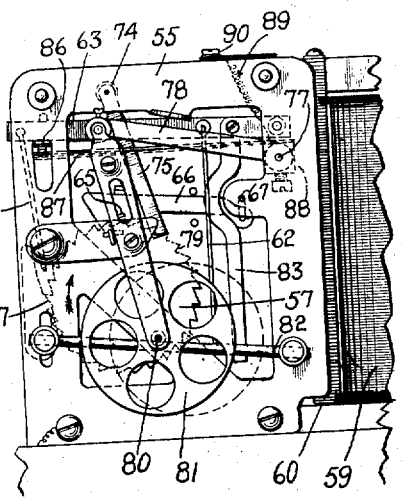
WITNESSES:
Newton A. Burgess
John O. Lampler
INVENTOR,
Edwin R. Gill,
BY Kenyon & Kenyon,
His ATTORNEYS

E. R. GILL.

AUTOMATIC SIGNAL OPERATOR.

APPLICATION FILED JULY 22, 1913.

Reissued Sept. 15, 1914.

13,800.

6 SHEETS—SHEET 6.

Edwin R. Gill,
INVENTOR,

WITNESSES:
Newton A. Bugess
John O. Geupler.

BY
Kenyon & Kenyon,
his ATTORNEYS

UNITED STATES PATENT OFFICE.

EDWIN R. GILL, OF YONKERS, NEW YORK, ASSIGNOR, BY MESNE ASSIGNMENTS, TO THE HALL SWITCH & SIGNAL COMPANY, A CORPORATION OF MAINE.

AUTOMATIC SIGNAL-OPERATOR.

13,800. Specification of Reissued Letters Patent. Reissued Sept. 15, 1914.

Original No. 1,024,444, dated April 23, 1912, Serial No. 458,204. Application for reissue filed July 22, 1913. Serial No. 780,584.

*To all whom it may concern:*

Be it known that I, EDWIN R. GILL, a citizen of the United States, residing in the city of Yonkers, county of Westchester, and State of New York, have invented a certain new and useful Improvement in Automatic Signal-Operators, of which the following is a specification.

The present invention has particular relation to automatic means for operating high speed selective signals for telephones, telegraphs and the like, and it may be used wherever a succession of long and short electrical impulses is to be produced under circumstances permitting permutation of the order of such impulses.

Many devices have been hitherto contrived whereby a number of signals at different points may be selectively operated over a single wire without interference among themselves, and among these an entire class is recognized wherein a movable contact piece is impelled forward rapidly step by step, the mechanism being so arranged that pauses may be produced after any one step forward, and so that each pause will cause a signal to operate at only one station. By pausing after the appropriate forward step, the operator is able to select which ever station he pleases and to call that station without disturbing any other upon the line. For convenience I shall refer herein to selective signaling means of this description as "high speed" signals.

My present invention is not concerned with the particular construction of any high speed selective signal and I have not illustrated such a signal herein, but its object is to supply means whereby merely depressing appropriate keys and starting an automatic circuit breaker will produce a succession of electric impulses on a main line including pauses so ordered as to cause those stations corresponding to the keys depressed to be called, and no others. It is to be understood, however, that my devices may be put to other than the above uses without departing from the scope of my invention.

The device is shown in a preferred illustrative embodiment in the accompanying drawings, wherein—

Figure 11:
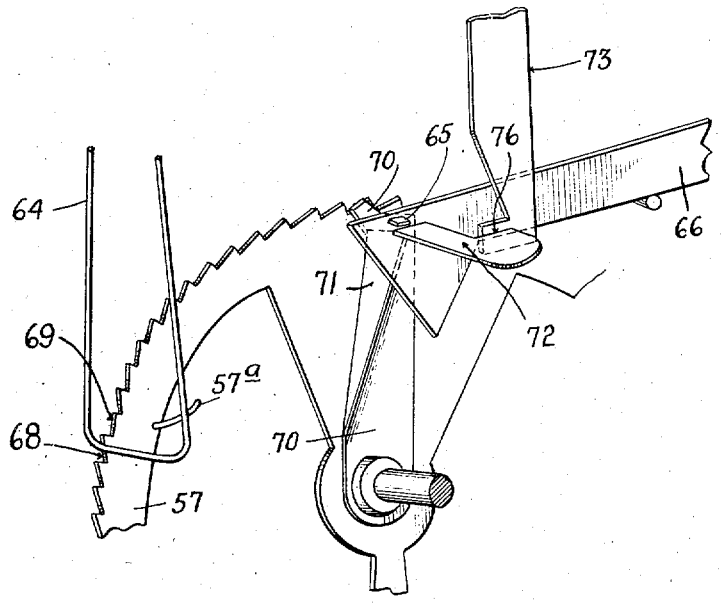

Figure 1 is a top view of the key-board and rotary switch; Fig. 2 is a vertical section on 2—2 in Fig. 1; Fig. 3 is a perspective of the escapement and arresting means; Fig. 4 is a partial sectional view on 4—4 in Fig. 6; Fig. 5 is a similar section on 5—5 in Fig. 4; Fig. 6 is an end view of the keyboard removed from its casing; Fig. 7 shows a top view of the keyboard and selecting switch, showing the general circuit arrangement in diagram; Fig. 8 is a side view of the freeing device; Fig. 9 is an end view of the same; Fig. 10 is a partial side view taken opposite to Fig. 9; and Fig. 11 shows a detail of the freeing device ratchet wheel.

Referring first to Fig. 7, the main line upon which are connected all of the selective signals or other devices intended to receive the impulses produced is shown at 10, and the local relay controlling the main circuit at 11. The preferred arrangement shown comprises four mechanisms which coöperate in producing the necessary variable and controllable series of long and short impulses. These are—

First:—An automatic switch normally producing a succession of impulses in rapid succession on the main line. This I term an automatic sender.

Second:—Means for producing a pause in the sender in any desired position corresponding to production of an electric impulse. This I term the automatic arrester.

Third:—Means for selecting and determining the particular positions of the sender at which the arrester becomes operative. This is the pause controller.

Fourth:—Automatic means whereby, after an appropriately timed pause, the action of the arrester is discontinued and the sender is freed. This is the freeing device.

In addition to these, I prefer also to employ means associated with the keyboard for preventing operation of the arrester, and this I term the line setting means or device. I may also use, as shown, a checking device in connection with the freeing device, whereby the action of the whole group may be watched during operation to make sure of its acting properly.

The automatic sender may be any form of switch whereby the electrical condition of the main line may be changed a number of times in succession, and for this purpose I prefer to use a circuit closing device.

In the exemplifying form shown in the accompanying drawings, the circuit closer used as an automatic sender comprises an insulated contact piece 12 and a movable contact piece 13. This latter, as shown, comprises a spring terminal which is controlled by clockwork, to the frame of which it is electrically connected. These two contacts are so connected to the battery 14 and the relay 11 as to close the main line circuit whenever brought together.

The operating clockwork comprises a main spring 15, which tends always to turn the main shaft 16 in the direction indicated by the arrow on the gear wheel 17 (see Fig. 1). This wheel is fast on the shaft 16, and, through a train of gears shown in dotted lines, it impels a coarsely toothed wheel 18. The spring terminal 13 carries a finger 19, so placed with relation to the wheel 18 that, as the latter turns with the arrow shown upon it in Fig. 1, said finger, and the terminal 13 with it, are raised by each tooth of the wheel 18 in succession, thus closing and opening the relay circuit at 12 at regular intervals. For the purposes of my complete system, the wheel 18 should have two more teeth than the total number of selective signals for which the complete apparatus is designed.

The motion of the clockwork is controlled in a well known manner by an escapement 20 comprising an extension 21 for a purpose described hereinafter. The main shaft 16 can be turned by a handle 22 and carries with it an arc-shaped stop arm 23 against which a stop pin 24 on the wheel 18 normally bears. In operating the device, the handle 22 is turned oppositely to the arrow in Fig. 1, until the stop arm strikes the pin 25. This frees the wheel 18, which turns with the arrow marked on it in Fig. 1, and the movements of the various shafts are so related that, when the wheel 18 has made one revolution, the pin 24 again strikes the stop arm and stops the clockwork. The frame of the clockwork is fixed to a metal strip 26 which connects, by the flat terminal 27 and wire 28, with the battery 14. The insulated terminal or contact piece 12 is connected by wires 29, 30 to one side of the relay 11.

The mechanism and connections thus far described suffice for producing a rapid succession of electrical impulses on the main line. In order to make these useful in selectively operating the type of signals heretofore mentioned, however, it is necessary to provide means whereby a long impulse is produced at the proper moment or moments for calling the desired station or stations. The automatic arrester is used for this purpose. In the form shown this element of my invention takes the form shown in Figs. 1 and 3, wherein an electro-magnet 31 is provided which controls a pivoted armature 32, normally kept away from the magnet pole by the springs 33. This armature carries a finger 34, so placed that, when the magnet is energized, the tip of said finger catches the tip of the extension 21 of the escapement and stops the clockwork. The means whereby the action of the arrester is appropriately timed is termed the pause controller.

In the preferred form shown, the pause controller comprises a keyboard and a selecting switch shown in Figs. 1, 2, 4, 5, 6 and 7. The device illustrated is adapted for calling any one of eleven stations and in Fig. 1 are shown eleven keys, 35, marked from 1 to 11. The key marked "Set" is for another purpose hereinafter described. The calling keys are supported in two rows by appropriate frame-work 36, and to each key is fixed a vertical stem 37 carrying a shoulder 38 and a cone 39 of insulating material. Each key is normally held up by a spiral spring 40. The lower ends of all the stems pass through holes in a guide plate 41 of insulating material. Close to each stem 37 a leaf spring 42 is fixed in the guide plate 41, the top of each spring playing within an individual slot 43 in a movable resetting plate 44 extending under all the keys and provided with openings through which the stems 37 pass. As shown in Figs. 4 and 5, these springs lie immediately under the sides of the conical shoulders 38 and are so shaped as to catch over said shoulders when these latter are depressed. This is shown at the lower side of Fig. 5 and the upper side of Fig. 4. It will thus be seen that, on pushing down any one of the keys 35, its shoulder 38 will be caught by its spring 42. On the other hand, whenever the resetting plate 44 is moved upward in Figs. 4 and 5, its engagement with all the springs 42 will cause all these latter to release any keys which they may be holding down, so that all the keys resume their normal positions under the influence of the spiral springs 40. I prefer to accomplish this function by means of the resetting magnets 45 supported under the two sides of the keyboard and, when energized, acting upon a pivoted armature 46 to push the sliding resetting plate upward in Fig. 2. The united action of the springs 42 returns the resetting plate to the normal position shown as soon as the magnet 45 is deënergized.

The middle stem 37 in Fig. 4 is shown in normal position and it is here seen that normally two electric spring terminals rest with their extremities in contact with the thin and the thick portions respectively of each cone 39. All the longer spring terminals 47 are electrically connected by thin rods or wires 48 in a single group, while the shorter terminals 49 are connected by wires 50, individually to their respective pins 51 in the selecting switch. (See Figs. 4 and 7.) Where (as is preferred) line setting means are employed, the wires 48 are connected normally through said means to the movable member of the selecting switch, which forms part of the pause controller. This connection is hereinafter described.

The shaft 52 of the toothed wheel 18 preferably carries the movable member of the selecting device. This is a spring arm 53 arranged so that its tip sweeps over the tops of the pins 51 as the shaft 52 revolves, and this arm is so placed that it makes contact with each pin 51 at the same time that the corresponding tooth of the wheel 18 is acting to close the relay circuit at 12, 13. As shown, there is the same number of pins 51 as of teeth on the wheel 18, viz.—two more than the number of stations intended to be selectively called. In the form shown, this is thirteen pins.

In order that the action of the automatic arrester may be discontinued after a proper time interval, thus limiting the duration of pauses produced thereby, a freeing device must be employed, and for this purpose I prefer to use the apparatus shown in Figs. 8 to 11, and in diagram in Fig. 7. Here the casing 54 incloses a framework 55 supporting a horizontal shaft 56 carrying a ratchet wheel 57 which is normally impelled in the direction of the arrow in Fig. 10, by the spiral spring 58. The electro-magnet 59 acts through the armature 60, bent spring 61 and wire 62 to operate an impelling lever 63. An impelling pawl 64 is pivoted to the end of the lever 63 and is so placed that, whenever energization of the magnet 59 permits the lever 63 to move downward, said pawl will move the ratchet wheel 57 one tooth forward. When the impelling pawl 64 rises, the retaining pawl 65 on the pivoted arm 66 acts on the teeth of the ratchet to prevent return to normal under the influence of the spring 58.

For purposes described hereinafter, the lever 66 is carried on a shaft 67 capable of moving longitudinally upon the long journals shown in Fig. 9, thus permitting the pawl 65 to be disengaged from the wheel 57 by lateral movement. The inclination of the shaft 67 facilitates return movement of the pawl over the wheel as hereinafter described and also tends to keep the pawl always over the wheel when it is intended to be there.

For the purposes described hereinafter, it is desirable that the action of the wheel 57 and its driving parts should be substantially as follows. When the wheel is at normal and before any call is begun any rapid impulses should produce only a back and forth motion through the space of one tooth. When a call is to be begun, a pause during an impulse (the magnet 59 being energized) should prepare the wheel for action. Thereafter every impulse, whether including a pause or not, should cause the wheel to move forward one step without backward movement, and this should continue until as many steps have been taken as there are selective calls in the particular system to be operated, after which the wheel should return to its original or normal position, in readiness for a new complete operation.

In Fig. 11 the relative positions of the operative teeth, the impelling pawl and the retaining pawl is one tooth farther advanced than the wheel can be made to move (in an eleven station system) without return to normal. This position is chosen in order to expose all the teeth plainly to view and make the following description more clear. At normal, the wheel 57 is so placed that the pawl 65 engages the square tooth 68, and the next succeeding tooth 69 is cut off shorter than the others, as shown. The next ten teeth are square all the way down and opposite the eleventh tooth I locate means for automatically displacing the retaining pawl so as to permit the ratchet wheel to return to normal. This means may take a variety of forms, but I prefer to make the same adjustable in position and to use the construction shown in Fig. 11.

An adjustable displacing plate 70 is revolubly mounted upon the shaft 56 close to the wheel 57, and, as shown, this plate has a small lip which projects over a tooth of said wheel. The plate 70 is provided with a cam surface, taking preferably the form of a recurved wing 71, and as the revolution of the wheel proceeds, this cam surface is brought against the rear edge of the lever 66 at the proper time, so as to push this lever, with its inclined shaft, laterally away from the wheel 57. This frees the wheel and permits it to return to normal. By use of this adjustable displacing means, which can be sprung laterally to free it from the teeth and then revolved into any position around the wheel desired, a given ratchet wheel of many teeth may be quickly prepared for use in connection with a system containing any desired number of selective signals less than the total number of teeth.

The pawl-carrying lever 66 is provided with an offset 72 so arranged with respect to the gravity hook 73, pivoted on the shaft 74, that, when the pawl 65 is raised above its position of engagement with the lower portion of any tooth, said hook drops under the offset 72 and prevents the pawl from falling back again to such lower position. An arm 75 (see Figs. 9 and 10) fixed to the end of the shaft 74 is employed as hereinafter described to withdraw the hook 73 from engagement with the offset at the proper time.

The lateral movement of the lever 66, caused by the sloping surface 71, throws the shoulder 76 of the offset 72 off of the hook 73, thus dropping the pawl 65 slightly while the wheel 57 returns to normal. At the end of this return motion, the curved pin 57[a] strikes the sloping edge of the lever 66 and, while drawing the pawl 65 once more over the wheel, throws it upward so that the hook 73 again catches the shoulder 76. In this position the pawl is held too high to catch on the low tooth 69. Now, the wheel 57 having thus returned to normal and the pawl 65 engaging the tooth 68, it will be seen that, when the impelling pawl 68 moves the wheel forward one tooth, the pawl 65, being held up above the low tooth 69 by the hook 73, can not keep the wheel in the new position. It will thus be seen that short impulses alone, however, numerous, will not carry the wheel 57 from normal position more than the distance of one tooth. In order to permit the wheel to progress beyond this distance, the hook 73 must be prevented from acting upon the pawl, thus permitting it to fall behind the short tooth 69 where it finds a surface of engagement which allows it to hold the wheel 57 and prevent return to normal. In order that this result may be produced by a pause on the first electric impulse, I prefer the following mechanism. A transverse revoluble shaft 77 carries an arm 78 to the end of which is pivoted a light frame 79, at the lower end of which a small axle 80 is journaled. This axle is provided with inertia wheels 81, and it rolls upon an inclined rod or track 82. Normally this system of levers and wheels is held in the position shown in Fig. 10 by an arm 83, attached to the impelling-pawl lever 63 and whose end extends across the edges of the inertia wheels 81. (See Fig. 9.) Each time the bent spring 61 raises the lever 63, the arm 83 moves toward the left in Fig. 10, thus sliding the shaft 80 quickly up the track 82 without causing the wheels 81 to turn. When the lever 63 is depressed in the act of impelling the ratchet wheel, the arm 83 frees the wheels 81 which, as they turn and cause the axle 80 to roll slowly down the track 82, cause a slow downward movement of the arm 78 and a consequent revolution of the shaft 77.

The arm or lever 75 above described extends across the path of the frame 79. (See Fig. 9.) Thus, if the lever 63 is held depressed long enough, the frame 79 will move far enough to the right to strike the lever 75, and this will push the hook 73 away from the offset 72, thus freeing the retaining pawl 65. It is thus evident that, while a quick electric impulse, producing a quick back and forth movement of the lever 63 and arm 83, will not permit the frame to move far enough to strike the arm 75 and free the pawl 65; a pause whereby the lever 63 is held down for a sufficient time will have this effect, and will thus permit the pawl 65 to engage with the lower portions of the teeth as they are successively brought into engaging position.

The retarded mechanism above described for tripping the arm 75 is preferably employed directly for opening the circuit of the arrester magnet 31, as follows. The frame of the freeing device above described is electrically connected by the wire 84 to the binding post 85, and on this frame is fixed a contact terminal 86. A long spring 87 is attached to the shaft 77, and is so placed and bent that its extremity normally touches the terminal 86 and that it does not leave the same until the end of the longest movement permitted to the retarded mechanism as above described. This position is shown in dotted lines in Fig. 10. The long terminal is carried on insulation 88 fixed to the shaft 77, and it is electrically connected by a fine flexible wire 89 to an insulated terminal 90 which is connected by the wire 91 with the binding post 92. Thus normally the terminals 86 and 87 are in contact, but, whenever a long impulse (including a pause) is transmitted through the magnet 59, these terminals are separated and circuit is broken.

Before describing the operation of the entire system it will be well to describe the two subsidiary devices which I have mentioned above as described but not essential. These are the checking device and the line setting device.

In Figs. 8 and 9 the casing 54 is shown provided with a window, 93, through which may be seen a dial 94, graduated and numbered. On an extension of the main shaft 56 is a pointer 95 whereby the number of the tooth opposite which the retaining pawl is placed at any moment may be read on the dial. It will be noted that the first graduation on the dial is numbered zero. This corresponds to the position of the wheel in which the tooth 69 is opposite the pawl, and also to contact of the lever 53 (Fig. 7) with the first of the pins 51. The person operating the call has this dial before him, and he can tell, by noting the numbers opposite which the needle pauses in its progress, whether or not the desired stations are being called. Also, when a so-called "answer-back" is combined in a well known manner with each selective signal, inspection of the dial will inform the operator just which station is answering back at any moment. The line setting device is any means, preferably a switch, so placed as to prevent the arrester magnet 31 from acting during operation of the sender, and I prefer to give it the form shown in the drawing.

In Figs. 1, 2, 4 and 7 it will be seen that the key placed opposite the word "Set" on the keyboard, although provided with all the elements described as associated with the other keys, and operated in the same manner, is provided with an inverted cone 96 of insulating material. As clearly shown in Fig. 4, the spring terminals 97, 98 associated with this inverted cone are normally held in contact by it, but when the cone is depressed by pushing down the key, the spring 98, coming opposite the narrow end of the cone is permitted to leave the terminal 97 and break circuit. This break is utilized, as described below, for preventing action of the magnet 31.

In operating the system thus described any one or all of the stations on the line may be called successively. Supposing it were desired to call stations 1 and 4, for instance, and to leave all other stations undisturbed. The operator will first depress the keys numbered 1 and 4 and no others, and will then turn the handle 22 as far as it will go to the right in Fig. 1, and release it. The main spring 15 revolves the shaft 52, arm 53 and toothed wheel 18. The first operation takes place when the arm 53 touches the first pin 51 and the terminal 13 has been lifted. When the first pin 51 is reached by the arm 53, current from battery 14 passes by wire 28, connections 27 and 26, to the arm 53; thence from the pin 51 by wire 99 to springs 97, 98, wire 100, connections 101, magnet 31, connections 102, wire 103, post 92, wire 91, across the normally contacting terminals 86, 87, wire 84, post 85, and wire 104 back to battery. At the same time a branch leaving the connections 26, 27, passes by terminals 12 and 13 and wire 29 to the magnet coils 59 in the freeing device and to the battery 14. A branch of this branch passes by wire 30 to the relay 11, whereby the main line circuit is closed to all of the selector devices at once. The result of these circuits is that, since the magnet 31 creates a pause making a long impulse, all the selector devices are prepared for action, and the freeing device acts to open the circuit of magnet 31 at 86, 87. The magnet 31 being thus made to free the automatic sender, all the selectors having been prepared by a single long impulse, and the freeing device having opened its own circuit at 86, 87, the contacts 86, 87 are made to come together again by the action of the arm 83 upon the inertia wheels 81. At the same time the automatic sender starts up again. The arm 53 then touches the second pin 51 which is connected by a wire 50 with the contact 49 under the key numbered 1. Inasmuch as this key has been pushed down, the springs 47 and 49 are in contact, and, as closure of circuit at these springs has the same effect as closure at 97, 98, (traced above) the magnet 31 and freeing device will be successively operated as before, and every selector device on the main line will receive a long impulse. It is only necessary, therefore, that the selector device at station number one should be adjusted, in a manner well known, to produce a signal when the pause occurs on the first impulse. The arm 53 next passes to pin number three, corresponding to station number 2. Since the particular wire 50 which leads from this pin to the spring 49 under key number two (not depressed) is not connected by contact between its springs 49, 47, the magnet 31, will not operate, and there will be no pause of the arm 53 on this third pin. There will be a quick impulse delivered through terminals 12, 13, both to the freeing device and to all the selector devices, which will all move forward one step, but without a pause. This last operation will be at once repeated for station number three, as the arm 53 sweeps over the fourth pin 51. When the arm reaches the fifth pin however, its corresponding key (No. 4) having been depressed, the magnet 31 will act again, and the signal at station number four will be rung in the same way as above described for number one. The arm 53 will then sweep rapidly over the remaining pins, producing no operation of the arrester but carrying the freeing device and all the station selectors without pause to the end of their possible movement at which point they all return automatically to normal. The arm 53 finally touches the thirteenth and last pin 51. This closes a circuit from battery 14, by wire 28, arm 53, pin 51, wire 105, resetting magnets 45, wires 106, and 104 to battery thus energizing the magnets 45 and returning the depressed keys to the upper positions. This prepares the keyboard for a new operation.

The line setting key is used where, for any reason the various selectors are believed or known to be out of correspondence. This might occur by one or more ratchet wheels in different selectors catching on their way back to normal or by some accident or interference. In such a case the key marked "Set" is depressed and the automatic sender is operated. Since the circuit of the arrester magnet 31 can only be closed through wires 48 and springs 97, 98, it follows that separation of these springs by depressing the "set" key prevents production of a pause at any point, whether or not any other of the keys has been depressed. Consequently, as the automatic sender moves, it will send out only quick impulses over the line, whereby all of the selectors are certainly brought to normal, preparatory to proper operation of the system. The line setting device can also be made useful sometimes for preventing mistakes in calling; for, if, after starting the device, the operator notices that he has depressed one or more wrong keys, he has only to quickly throw down the "set"

key to make all calls inoperative and reset the keyboard after which he can correct the adjustment and proceed.

In the drawings I have shown a single battery used for all purposes, but of course my invention covers the use of separate batteries in the different circuits if desired, for which binding posts are shown on the left side of Fig. 1. Indeed many changes can be made in the arrangement of circuits and in the mechanical construction as will be well understood by those skilled in the art, without departing from my invention.

What I claim is—

1. A device of the class described comprising in combination an automatic sender of electrical impulses, an automatic arrester therefor, a pause controller, circuits connecting the devices aforesaid, and line setting means adapted to prevent operation of said arrester at will, substantially as described.

2. A device of the class described comprising in combination an automatic sender of electrical impulses, an automatic arrester therefor, a pause controller, a freeing device, circuits connecting the devices aforesaid, and line setting means adapted to prevent operation of said arrester at will, substantially as described.

3. A device of the class described comprising in combination an automatic sender of electrical impulses, an automatic arrester therefor, a pause controller, circuits connecting the devices aforesaid, and means for altering said circuits at will for rendering the arrester inoperative, substantially as described.

4. A device of the class described comprising in combination an automatic sender of electrical impulses, an automatic electro-magnetic arrester therefor, a pause controller comprising a number of switches, circuits connecting said switches with said arrester, and a line setting switch for controlling all of said circuits, substantially as described.

5. A device of the class described comprising in combination an automatic sender of electrical impulses, an automatic arrester therefor, a pause controller, electro-magnetic resetting means for said pause controller and appropriate circuits for automatically operating said resetting device after each operation of the automatic sender, substantially as described.

6. A device of the class described comprising in combination an automatic sender of electrical impulses, an arrester therefor, an automatic circuit breaker in circuit with said arrester, an electro-magnet for controlling said circuit-breaker, an automatic switch actuated by said sender, circuits between said switch and said magnet, and means operating only on prolonged energizing of said magnet for actuating said circuit-breaker, substantially as described.

7. A device of the class described comprising in combination an automatic sender of electrical impulses, an arrester therefor, a freeing device for said arrester and a checking device for indicating the progress of said freeing device, substantially as described.

8. A device of the class described comprising in combination an automatic sender of electrical impulses, an arrester therefor, a freeing device for said arrester comprising a ratchet wheel and means for advancing the same step by step, and a checking device comprising a pointer actuated by said ratchet wheel and a graduated dial behind said pointer, substantially as described.

9. A device of the class described comprising in combination an automatic sender for normally producing electric impulses in rapid succession, clockwork including an escapement for actuating said sender, a device for engaging said escapement to stop the clockwork, an electro-magnet for controlling said last named device, manually controlled circuit closers, a selecting switch moving with said clockwork, and circuits connecting said devices to permit said circuit closers and selecting switch to control the operation of said magnet, substantially as described.

10. In a system of the kind described, an automatic sender of electrical impulses, a clock-work for actuating said sender including an escapement having a reciprocating extension, an electro-magnet near said clock-work, a pivoted finger adapted to move into and out of the path of movement of said extension, an armature for said magnet arranged to actuate said finger, a circuit closer connected to the clock-work and circuits including said magnet and said circuit closer.

11. In a device of the class described, an automatic sender of electrical impulses comprising a circuit closer and a toothed wheel for controlling the same, a switch arm adapted to turn with said toothed wheel, a series of terminals over which said arm is adapted to move, an arrester for the sender, a pause controller, and circuits including said arm and terminals for controlling action of said arrester, substantially as described.

12. In combination with an automatic sender of electrical impulses and an arrester therefor, a pause controller comprising a series of switches, operating keys therefor, a common resetting means for said keys, an electro-magnet for actuating said means, and an automatic switch operated by said sender in circuit with said magnet for controlling it, substantially as described.

13. In combination with an automatic sender of electrical impulses and an arrester therefor, a pause controller comprising a series of switches, operating keys therefor, a sliding resetting plate under said keys adapted when pushed to return them to normal, an electro-magnet having its poles extending along the two sides of the pause controller keys, a pivoted armature controlled by said magnet and adapted to push said sliding plate, and means for energizing said magnet at the end of each operation of said sender, substantially as described.

14. In combination with an automatic sender of electrical impulses and an arrester therefor, a pause controller comprising pairs of spring terminals, keys for controlling the same, a selecting switch operated by said sender and comprising a series of separate contacts, individual connections between one of each pair of spring terminals and a corresponding one of said separate contacts, and a common electric connection between a single one of said contacts and all the remaining spring terminals, substantially as described.

15. In a system of the class described, a pause controller comprising a row of pairs of spring terminals, an operating stem for each pair, each stem having a shoulder, a common resetting plate through holes in which all of said stems pass, springs normally tending to lift said stems, means on each stem for actuating the spring terminals when the stem is depressed, and a leaf spring for each stem each adapted to catch over the shoulder on its appropriate stem, said leaf springs engaging the common resetting plate, substantially as described.

16. In combination with an automatic sender of electrical impulses, an arrester and a pause controller, a freeing device including an electro-magnet in circuit with said sender, a ratchet wheel having one short tooth and impelled by said magnet, a retaining pawl, a movable support normally causing said pawl to engage only the upper part of the ratchet teeth, means adapted to act on prolonged energization of said magnet to release said pawl from said support, and means for returning said ratchet wheel to normal after a predetermined movement of the freeing device.

17. In combinatior with an automatic sender of electrical impulses, an arrester and a pause controller, a freeing device including an electro-magnet in circuit with said sender, a ratchet wheel having one short tooth and impelled by said magnet, a spring tending to return said wheel to normal, a retaining pawl normally engaging the tooth behind the short tooth on said wheel, a movable support normally holding said pawl just out of the range of movement of said short tooth, retarded means adapted to act on prolonged energization of said magnet to release said pawl from said support, and means actuated by said ratchet wheel at the end of its prescribed movement for forcing the retaining pawl laterally out of engagement with the ratchet wheel, substantially as described.

18. In combination with an automatic sender of electrical impulses, an arrester and a pause controller, a freeing device including an electro-magnet in circuit with said sender, a ratchet wheel having one short tooth and impelled by said magnet, a spring tending to return said wheel to normal, a retaining pawl, a movable support normally causing said pawl to engage only the upper part of the ratchet teeth, slow-moving means released by energizing said magnet adapted to release said pawl from said support, a circuit-opening switch adapted to be operated by said slow-moving means at the end of its complete movement, and means for returning said ratchet wheel to normal after a predetermined movement of the freeing device, substantially as described.

19. In a system of the class described, a freeing device comprising an impelling magnet, a ratchet wheel actuated thereby and having one short tooth, a spring for returning said wheel to normal, a retaining pawl, a movable support normally holding said pawl just out of the range of said short tooth, a retarded mechanism tending to move into position to free said pawl from said support and means actuated by said magnet for alternately releasing and restraining said retarded mechanism and permitting the same to act upon said support when the period of release is sufficiently prolonged, substantially as described.

20. In a system of the class described, a freeing device comprising an impelling magnet, a ratchet wheel actuated thereby, a spring for returning said wheel to normal, a retaining pawl, a pivoted lever carrying said pawl and mounted so as to be laterally movable for releasing the wheel, and means upon the side of the wheel adapted to impinge against said lever for moving it laterally, substantially as described.

21. In a system of the class described, a freeing device comprising an impelling magnet, a ratchet wheel actuated thereby, a spring for returning said wheel to normal, a retaining pawl, a pivoted lever carrying said pawl and mounted so as to be movable laterally to free said wheel, and adjustable means secured to the wheel for causing lateral movement of said pawl, substantially as described.

22. In a system of the class described, a freeing device comprising an impelling magnet, a ratchet wheel actuated thereby, a spring for returning said wheel to normal, a retaining pawl, a pivoted lever carrying said pawl and mounted so as to be movable laterally to free said wheel and a plate pivoted close to said ratchet wheel upon its shaft and provided with an inclined portion adapted to cause lateral movement of said pawl by impinging against said lever, substantially as described.

23. In a selective calling device, means for impressing a plurality of impulses on a line some of them being prolonged, means for determining which of said impulses are to be prolonged and automatic means terminating the prolonged impulses.

24. In a calling device, means for impressing a plurality of impulses on a selector circuit to operate signals at different points on said circuit in response to a prolonged impulse on said circuit, means for determining which and how many of said impulses are to be prolonged and automatic means terminating the prolonged impulses.

25. In a call device the combination of an impulse controlling device, a plurality of individual operating devices, one for each call, means interposed between said operating devices and said impulse mechanism to selectively control the operation of said impulse mechanism.

26. In a selective call device a relay for impressing impulses on a line, circuits controlling said relay, keys for selecting some of said circuits and a common contact means for closing the controlling circuits.

27. In a selective call device, a relay for impressing impulses on a line, an operating circuit for said relay, controlling circuits for said relay, means for selecting said controlling circuits and means for closing said operating and controlling circuits.

28. In a selective call device a relay for impressing a plurality of impulses on a circuit some of which impulses are prolonged, circuits for said relay, means in some of said relay circuits for determining which and how many of said impulses are to be prolonged and the length thereof, and means for closing said circuits whereby a plurality of calls may be made successively and automatically.

In testimony whereof, I have signed my name to this specification, in the presence of two subscribing witnesses.

EDWIN R. GILL.

Witnesses:
H. B. YOUNKIN,
NEWTON A. BURGESS.

Copies of this patent may be obtained for five cents each, by addressing the "Commissioner of Patents. Washington, D. C."